United States Patent
Conary et al.

(10) Patent No.: US 6,330,679 B1
(45) Date of Patent: *Dec. 11, 2001

(54) INPUT BUFFER CIRCUIT WITH DUAL POWER DOWN FUNCTIONS

(75) Inventors: James Conary, Aloha; Vijaya Bandara Wickremarachchi, Portland, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,167

(22) Filed: Dec. 31, 1997

(51) Int. Cl.[7] ................ G06F 1/26; G06F 1/28; G06F 1/30
(52) U.S. Cl. ............... 713/300; 713/322; 713/323; 713/500; 326/81; 326/103; 365/226; 365/185.18
(58) Field of Search ................ 713/300, 322, 713/323, 500; 710/52, 3, 26; 326/81, 103; 327/333, 544, 156; 365/189.11, 226, 185.18; 330/253

(56) References Cited

U.S. PATENT DOCUMENTS

| | | | |
|---|---|---|---|
| 4,393,491 | * | 7/1983 | Ashlock et al. ............. 370/13 |
| 5,388,265 | * | 2/1995 | Volk ............................. 713/300 |
| 5,420,808 | * | 5/1995 | Alexander et al. ........... 364/707 |
| 5,444,860 | * | 8/1995 | Datwyler et al. ............. 395/500 |
| 5,535,400 | * | 7/1996 | Belmont ....................... 713/300 |
| 5,559,464 | * | 9/1996 | Orii et al. .................... 327/333 |
| 5,603,037 | * | 2/1997 | Aybay ......................... 713/300 |
| 5,666,537 | * | 9/1997 | Debnath et al. ............. 713/322 |
| 5,721,935 | * | 2/1998 | DeSchepper et al. ........ 713/300 |
| 5,736,869 | * | 4/1998 | Wei ............................. 326/81 |
| 5,778,237 | * | 7/1998 | Yamamoto et al. .......... 713/322 |
| 5,787,298 | * | 7/1998 | Broedner et al. ........... 713/323 |
| 5,835,435 | * | 11/1998 | Bogin et al. ................ 365/227 |
| 5,901,322 | * | 5/1999 | Herbst et al. ............... 713/322 |
| 5,935,253 | * | 10/1999 | Conary et al. .............. 713/322 |
| 5,936,896 | * | 8/1999 | Cho et al. ................... 365/189.11 |
| 5,943,263 | * | 8/1999 | Roohparvar ................ 365/185.18 |
| 5,949,261 | * | 9/1999 | Field et al. .................. 327/156 |
| 5,949,284 | * | 9/1999 | Frisch ......................... 330/253 |
| 5,963,057 | * | 10/1999 | Schmitt et al. .............. 326/103 |
| 5,966,045 | * | 10/1999 | Asakura ...................... 327/544 |
| 6,029,006 | * | 2/2000 | Alexander et al. .......... 713/323 |
| 6,040,845 | * | 3/2000 | Melo et al. .................. 710/129 |
| 6,055,659 | * | 4/2000 | Whetsel ...................... 714/726 |
| 6,065,124 | * | 5/2000 | Lee ............................. 713/323 |
| 6,246,626 | * | 6/2001 | Roohparvar ................ 365/226 |

* cited by examiner

Primary Examiner—Ayaz Sheikh
Assistant Examiner—Frank B. Jean
(74) Attorney, Agent, or Firm—Kenyon & Kenyon

(57) ABSTRACT

An input buffer circuit includes an input buffer. The input buffer has an input adapted to be coupled to an address bus and a power down input. The input buffer circuit further includes power down circuitry adapted to be coupled to an address bus strobe and coupled to the power down input. When the address bus is detected to be idle by the power down circuitry, a power down signal is sent to the power down input. This powers down the input buffer.

23 Claims, 4 Drawing Sheets

INPUT BUFFER CIRCUIT WITH DUAL POWER DOWN FUNCTIONS

FIELD OF THE INVENTION

The present invention is directed to an input buffer circuit. More particularly, the present invention is directed to an input buffer circuit with dual power down functions.

BACKGROUND OF THE INVENTION

Computer systems include many different types of devices such as processors, memory, memory controllers, etc. Computer system devices typically include an input buffer circuit that includes a plurality of input buffers. An input buffer is a gate that receives an input signal and isolates the input signal from a load.

In some computer systems, different devices require different operating voltages. For example, in computer systems that include the Pentium® Pro processor from Intel Corp., the processor operates at approximately 2.0 volts and peripheral devices such as memory controllers operate at approximately 3.3 volts. In these computer systems, a device that receives inputs from a device that is operating at a different voltage level must buffer the inputs with translating input buffers. A translating input buffer translates the voltage level of an input to the voltage level of the receiving device.

One known type of translating input buffer is a differential amplifier input buffer. Differential amplifier input buffers are desirable as translating input buffers because they can operate at high speeds. However, one problem with known differential amplifier input buffers is that they consume a large amount of direct current ("DC") power. This problem can substantially reduce the length of time portable computer systems that include these types of input buffers can operate with a single battery.

Based on the foregoing, there is a need for an input buffer circuit that reduces the amount of power consumed by the input buffers.

SUMMARY OF THE INVENTION

One embodiment of the present invention is an input buffer circuit that includes an input buffer. The input buffer has an input adapted to be coupled to a bus and a power down input. The input buffer circuit further includes power down circuitry adapted to be coupled to a bus strobe and coupled to the power down input.

DETAILED DESCRIPTION

One embodiment of the present invention is a input buffer circuit in which input buffers coupled to an address bus are powered down when the address bus, as indicated by an address bus strobe, is idle.

Figure 1:
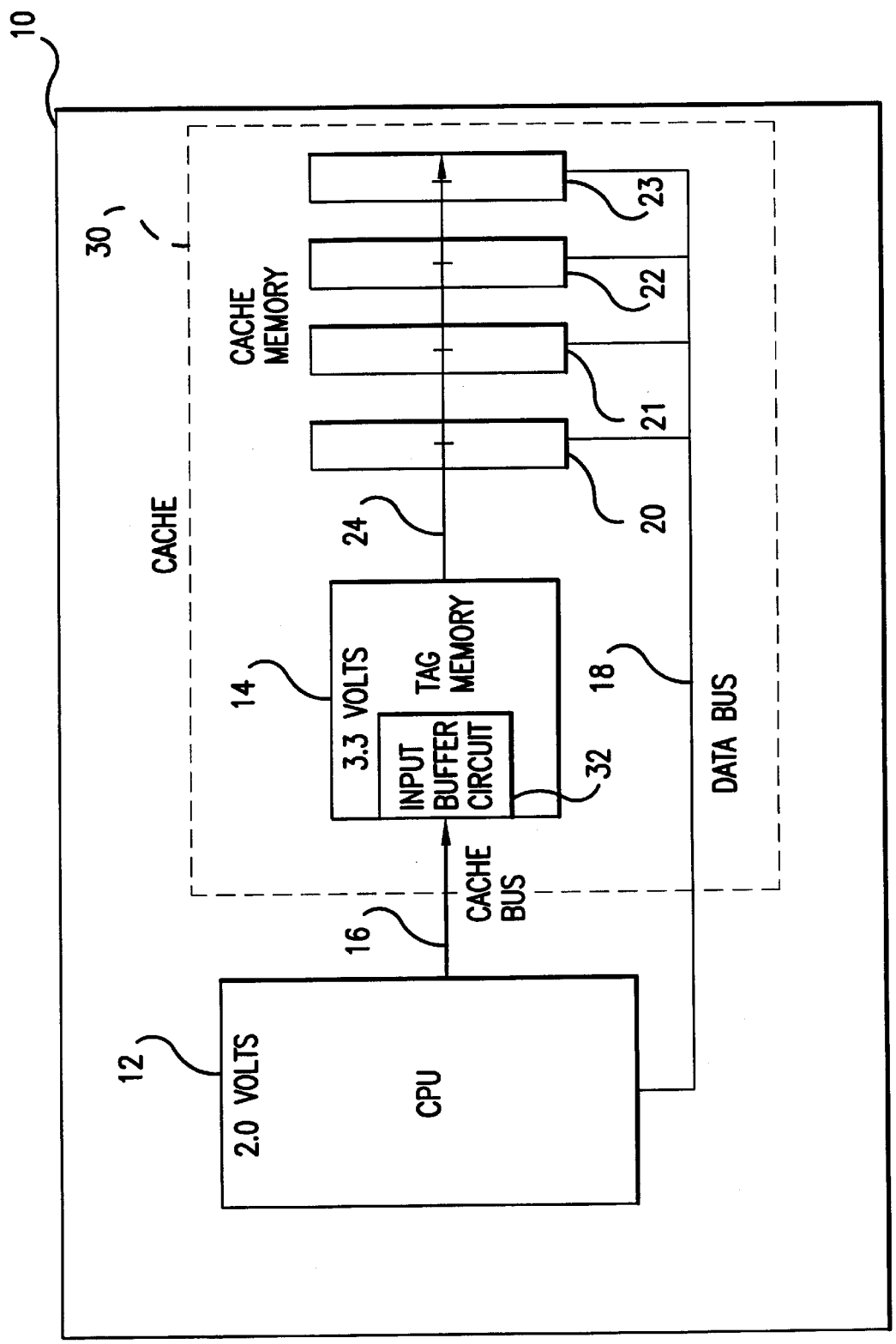
FIG. 1 is a block diagram partially illustrating one embodiment of a computer system that implements the present invention.

FIG. 1 is a block diagram partially illustrating one embodiment of a computer system that implements the present invention. The computer system 10 includes a central processing unit ("CPU") 12 coupled to a cache 30 through a cache bus 16 and a data bus 18.

Cache 30 includes tag memory 14 and a plurality of cache memory 20–23. In one embodiment, cache memory 20–23 is comprised of a plurality of rows of high-speed static random access memory ("SRAM"). Cache memory 20–23 stores memory blocks from the main memory (not shown in FIG. 1) of computer system 10. CPU 12 can access the memory blocks stored in cache memory 20–23 more quickly than memory blocks stored in the main memory.

Each memory block stored in cache memory 20–23 is assigned a unique identifier, referred to as a "tag." Tag memory 14 stores the tags for each cached memory block. CPU 12 requests access to a cached memory block via cache bus 16. Cache bus 16 includes an address bus, an address bus strobe, and a clock input. The address bus strobe indicates when a valid address is on the address bus. The address bus strobe further indicates when the address bus is idle (i.e., when the address bus does not carry a valid address).

After receiving a requested address of a memory block over cache bus 16 from CPU 12, tag memory 14 selects the desired memory block from cache memory 20–23 via select line 24. The selected memory block is transferred to CPU 12 from cache memory 20–23 via data bus 18 in a read operation. Similarly, the selected memory block is transferred to cache memory 20–23 from CPU 12 via data bus 18 in a write operation.

Tag memory 14 includes an input buffer circuit 32 for receiving inputs from CPU 12 over cache bus 16. Input buffer circuit 32 includes an input buffer corresponding to each input of cache bus 16. In the embodiment shown in FIG. 1, CPU 12 operates at approximately 2.0 volts and tag memory 14 operates at approximately 3.3 volts. Therefore, most of the input buffers included in input buffer circuit 32 are differential amplifier input buffers in order to translate the inputs.

Figure 2:
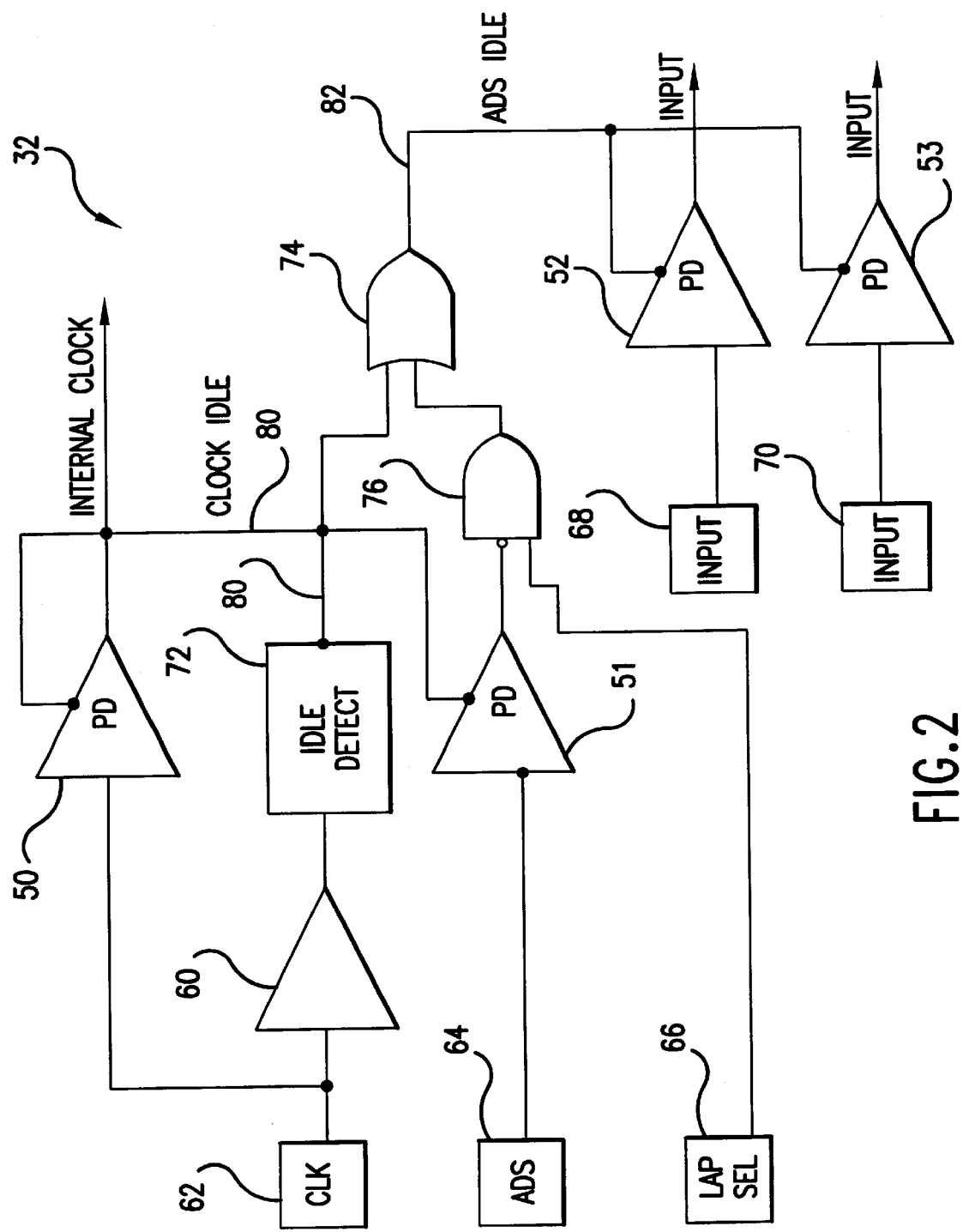
FIG. 2 is a circuit diagram illustrating an input buffer circuit in accordance with one embodiment of the present invention.

FIG. 2 is a circuit diagram illustrating input buffer circuit 32 in accordance with one embodiment of the present invention. Input buffer circuit 32 receives multiple inputs from cache bus 16. The inputs include a clock input 62, an address strobe input 64, and a plurality of address bus inputs, of which only two, inputs 68, 70 are shown. One address bus input is received for every bit on the address bus. The inputs further include a laptop select input 66. Laptop select input 66 indicates when input buffer circuit 32 is operating in a portable, battery operated computer where power consumption should be minimized.

Input buffer circuit 32 includes a plurality of differential amplifier input buffers 50–53. Each differential amplifier input buffer 50–53 includes a "power down" input ("PD"). A high signal on a power down input removes the respective differential amplifier input buffer from its power source (i.e., the input buffer is powered down). Input buffer circuit 32 further includes input buffer 60. Input buffer 60 can be any type of known input buffer including an inverter-type buffer or other low-speed buffer. Input buffer 60 does not have a power down input.

Clock input 62 is coupled to input buffer 50 and input buffer 60. The output of input buffer 60 is coupled to an idle detect circuit 72. Idle detect circuit 72 outputs a high signal on a clock idle line 80 when clock input 62 is idle. Otherwise, idle detect circuit 72 outputs a low signal on clock idle line 80. Clock idle line 80 is coupled to the power down input of input buffers 50 and 51.

Input buffer circuit 32 further includes an "AND" gate 76 and an "OR" gate 74. Address strobe input 64 is coupled to input buffer 51. The inverse output of input buffer 51 is coupled to AND gate 76. Laptop select input 66 is coupled to the other input of AND gate 76. The output of AND gate 76 is coupled to one input of OR gate 74. Clock idle line 80 is coupled to the other input of OR gate 74. The output of OR gate 74, referred to as "address strobe idle" line 82, is coupled to the power down inputs of all address bus input buffers, of which, as noted, only input buffers 52 and 53 are shown. The outputs of input buffers 52 and 53 are the address bus inputs received by tag memory 14. The output of input buffer 50 is an internal clock provided to tag memory 14.

In operation, input buffer circuit 32 includes two power down functions. The first power down function operates when laptop select input 66 is low (i.e., input buffer circuit 32 is not operating in a portable, battery operated computer). In this first function, when clock input 62 is idle, clock idle line 80 powers down all differential input amplifier buffers 50–53. Input buffer 60 remains powered up at all times to detect any activity of clock input 62. In this first power down function, clock input 62 controls the power down inputs of differential input buffers 50 and 51 through clock idle line 80 and controls the power down inputs of the remaining differential input buffers 52 and 53 through address strobe idle line 82.

The second power down function operates when laptop select input 66 is high (i.e., input buffer 32 is operating in a portable, battery operated computer). The high signal from laptop select input 66 allows address strobe input 64 to control the output of AND gate 76, and therefore to control address strobe idle line 82, which controls input buffers 52 and 53. Input buffers 52 and 53 are powered down when address strobe input 64 is low, which indicates that the address bus is idle. Input buffers 52 and 53 are powered up when address strobe input 64 is high, which indicates that the address bus is active. Therefore, in this second power down function, address strobe input 64 controls input buffers 52, 53 regardless of whether clock input 62 is idle or not.

Figure 3:
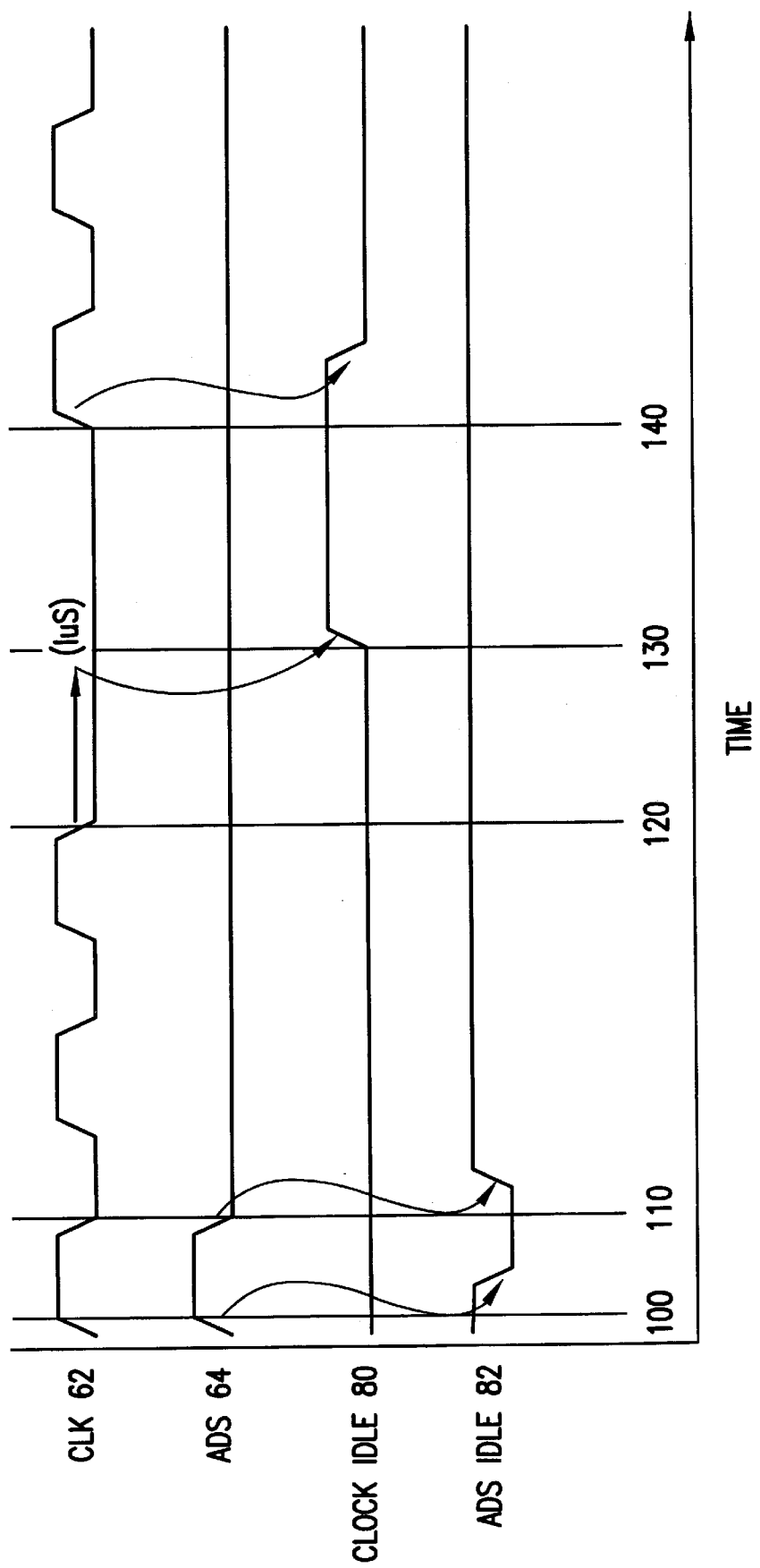
FIG. 3 is a timing diagram illustrating an example of the timing that occurs in the second power down function of the input buffer circuit.

FIG. 3 is a timing diagram illustrating an example of the timing that occurs in the second power down function of input buffer circuit 32. At time 100, address strobe input 64 goes high. As a result, address strobe idle line 82 goes low which powers up input buffers 52 and 53. At time 110, address strobe input 64 goes low, which causes address strobe idle line 82 to go high and power down input buffers 52 and 53. At time 120, clock input 62 becomes idle. Shortly thereafter, clock idle line 80 goes from low to high which powers down input buffers 50–53. In one embodiment, the time delay from clock input 62 going idle to clock idle line 80 going high is approximately one microsecond. Finally, at time 140, clock input 62 becomes active again which causes clock idle line 80 to go low and power up input buffers 50 and 51.

Figure 4:
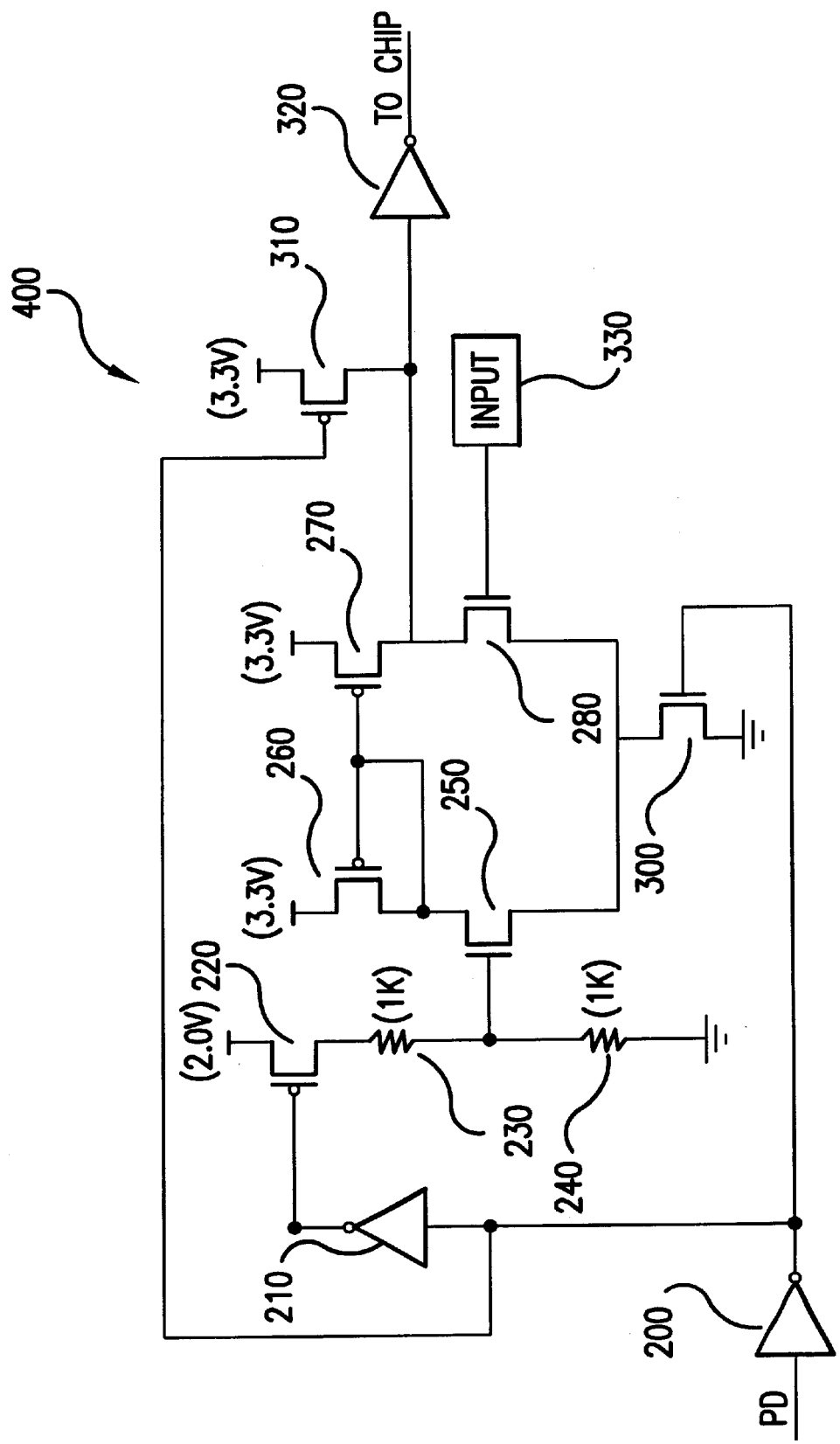
FIG. 4 is a circuit diagram of one embodiment of a differential input amplifier buffer which can be used for the input buffers of FIG. 1.

FIG. 4 is a circuit diagram of one embodiment of a differential input amplifier buffer 400 which can be used for buffers 50–53 of FIG. 1. The input buffer 400 of FIG. 4 includes a current mirror that receives the input signal 330. The current mirror circuit includes two P-channel transistors 260 and 270 coupled to two N-channel transistors 250 and 280. P-channel transistors 260 and 270 are coupled to the voltage level of the receiving device (e.g., tag memory 14 of FIG. 1). This may be, for example, 3.3 volts. Input signal 330 is coupled to the gate of N-channel transistor 280. The output of the current mirror between P-channel transistor 270 and N-channel transistor 280 is coupled to an inverter 320 which sends the output to the receiving device.

The current mirror is coupled to a resistor divider circuit through the gate of N-channel transistor 250. The resistor divider circuit includes two resistors 230 and 240 of equal resistance value. In one embodiment this resistance value is 1000 ohms. One end of the resistor divider circuit is coupled to the voltage level of the input device (e.g., CPU 12 of FIG. 1) through a P-channel transistor 220. The voltage level may be, for example, 2.0 volts.

A power down circuit can disconnect input buffer 400 from the power supply. The power down circuit includes inverters 200 and 210. Inverter 200 is coupled to an N-channel transistor 300 which couples transistors 250 and 280 to ground. Inverter 200 is further coupled to a P-channel transistor 310 which is coupled to 3.3 volts. Inverter 210 is coupled to the P-channel transistor 220 which couples the resistor divider circuit to 2.0 volts. P-channel transistor 220, when turned on, has a resistance level substantially smaller than the resistance level of resistors 230, 240. In one embodiment this resistance level is less than 100 ohms.

In operation, input buffer 400 is powered up by applying a low signal to inverter 200. While powered up, the output of the resistor divider circuit inputs 1.0 volts to the gate of transistor 250 because the resistor divider circuit evenly splits the 2.0 volts to which it is coupled. Then, as the input signal at the gate of transistor 280 changes from ground to 2.0 volts and vice versa, the output of the current mirror at buffer 320 changes from ground to 3.3 volts and vice versa respectively.

Differential amplifier input buffer 400 is powered down by applying a high signal to inverter 200. This disconnects input buffer 400 from the power supply by turning off transistors 220 and 300 and turning on transistor 310.

As described, one embodiment of the present invention is an input buffer circuit with two power down functions. In one function, all differential input amplifier buffers are powered down when the clock input is idle. In the second function, all differential input amplifier buffers are also powered down when the clock input is idle. Further, in the second function, when the clock input is not idle, all differential input amplifier buffers coupled to the address bus are powered down when the address strobe indicates that the address bus is idle. Therefore, by frequently powering down the differential input amplifier buffers, the present invention reduces power consumption.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, input buffers 50–53 are not required to be differential amplifier input buffers. Input buffers 50–53 can be any known type of input buffer that includes a power down input.

In addition, input buffer circuit 32 can be implemented without receiving a laptop select input 66. In this embodiment, AND gate 76 is not needed and the inverse output of input buffer 51 is directly coupled to OR gate 74. Input buffer circuit 32 in this embodiment is always in "laptop" mode.

Further, input buffer circuit 32 can be coupled to any type of strobed bus, including an address bus. For example, input buffer circuit 32 can be coupled to a data bus and a corresponding data strobe.

What is claimed is:

1. An input buffer circuit comprising:

a first input buffer having an input adapted to be coupled to a bus and having a first power down input; and power down circuitry having an input adapted to be coupled to a bus strobe and an output coupled to said first power down input, wherein said power down circuitry provides a first power down signal to said first power down input when the bus is idle, and wherein said power down circuitry comprises:

a second input buffer adapted to be coupled to the bus strobe, said second input buffer having a second power down input and having an output; and an OR gate having a first input coupled to said second input buffer output and having a second input, said OR gate to provide said first power down signal.

2. The input buffer circuit of claim 1, further comprising:

an idle detect circuit having an input adapted to be coupled to a clock signal and having an output coupled both to said second input of said OR gate and to said second power down input;

wherein said idle detect circuit provides a second power down signal when the clock signal is idle.

3. The input buffer circuit of claim 2, further comprising:

a third input buffer adapted to be coupled to the clock signal, said third input buffer having a third power down input coupled to said idle detect circuit output.

4. The input buffer of claim 3, wherein each of said first input buffer, second input buffer and third input buffer is a differential amplifier input buffer.

5. The input buffer of claim 4, wherein said differential amplifier input buffer comprises:

a current mirror circuit;

a resistor divider circuit coupled to said current mirror circuit; and a power down circuit coupled to said current mirror circuit and said resistor divider circuit.

6. The input buffer circuit of claim 2, wherein said power down circuitry further comprises an AND gate having a first input coupled to said second input buffer output, having a second input adapted to be coupled to a laptop select input, and having an output coupled to said OR gate first input.

7. The input buffer of claim 1, wherein the bus is an address bus and the bus strobe is an address bus strobe.

8. A computer system comprising:

a central processing unit having a bus and a bus strobe;

a computer device coupled to said bus and said bus strobe, wherein said computer device comprises an input buffer circuit;

wherein said input buffer circuit comprises:

a first input buffer having an input coupled to said bus and having a first power down input;

a second input buffer coupled to said bus strobe, said second input buffer having a second power down input and having an output; and a first gate having a first input coupled to said second input buffer output and having a second input, said first gate to provide a first power down signal at said first power down input when said bus is idle.

9. The computer system of claim 8, further comprising a clock signal, wherein said input buffer circuit further comprises:

an idle detect circuit having an input coupled to said clock signal and having an output coupled to said second input of said first gate and coupled to said second power down input;

wherein said idle detect circuit provides a second power down signal when the clock signal is idle.

10. The computer system of claim 9, wherein said input buffer circuit further comprises:

a third input buffer coupled to said clock signal, said third input buffer having a third power down input coupled to said idle detect circuit output.

11. The computer system of claim 10, wherein each of said first input buffer, second input buffer and third input buffer is a differential amplifier input buffer.

12. The computer system of claim 11, wherein said differential amplifier input buffer comprises:

a current mirror circuit;

a resistor divider circuit coupled to said current mirror circuit; and a power down circuit coupled to said current mirror circuit and said resistor divider circuit.

13. The computer system of claim 9 further comprising a laptop select input, wherein said power down circuitry further comprises:

an AND gate having a first input coupled to said second input buffer output, having a second input coupled to the laptop select input, and having an output coupled to the first input of said first gate.

14. The computer system of claim 8, wherein said computer device is a cache.

15. The computer system of claim 14, wherein said cache comprises a plurality of cache memory and a tag memory, and wherein said tag memory includes said input buffer circuit.

16. The computer system of claim 8, wherein said central processing unit operates at a first voltage and said computer device operates at a second voltage.

17. The computer system of claim 16, wherein said first voltage is substantially 2.0 volts and said second voltage is substantially 3.3 volts.

18. The computer system of claim 8, wherein said bus is an address bus and said bus strobe is an address bus strobe.

19. A method of operating an input buffer circuit comprising one or more first input buffers coupled to a bus and a second input buffer coupled to a bus strobe, wherein the first input buffers each have a first power down input, wherein the input buffer circuit further comprises a third input buffer coupled to a clock input, and wherein the second and third input buffers have a power down input, said method comprising the steps of:

(a) determining whether the bus is idle; and (b) powering down the first input buffers if the bus is idle by providing a first power down signal to the first power down inputs from the second input buffer;

(c) determining whether the clock input is idle; and (d) providing a second power down signal to the power down inputs of the second and third input buffers if the clock input is idle.

20. The method of claim 19, further comprising the step of:

(e) providing the second power down signal to the first power down inputs if the clock input is idle.

21. The method of claim 19, wherein the input buffer circuit is included in a tag memory.

22. The method of claim 19, wherein the first input buffers and the second input buffer are differential input amplifier buffers.

23. The method of claim 19, wherein the bus is an address bus and the bus strobe is an address bus strobe.

* * * * *